(12) United States Patent
Nees

(10) Patent No.: US 6,643,931 B2
(45) Date of Patent: Nov. 11, 2003

(54) METHOD OF MANUFACTURING A ONE-PIECE TUBULAR DOORBEAM

(75) Inventor: Rainer B. Nees, Brighton, MI (US)

(73) Assignee: Shape Corporation, Grand Haven, MI (US)

( * ) Notice: Subject to any disclaimer, the term of this patent is extended or adjusted under 35 U.S.C. 154(b) by 280 days.

(21) Appl. No.: 09/822,658

(22) Filed: Mar. 30, 2001

(65) Prior Publication Data

US 2002/0138987 A1 Oct. 3, 2002

Related U.S. Application Data

(60) Provisional application No. 60/217,790, filed on Jul. 12, 2000.

(51) Int. Cl.[7] .............................................. B21D 47/00
(52) U.S. Cl. ................................ 29/897.312; 29/897.2; 29/414; 29/417
(58) Field of Search ........................... 29/897.312, 897, 29/897.2, 412, 414, 415, 417, 557, 897.3, 33 D, 33 T; 228/160, 159; 72/168, 52, 370.1; 52/731.6, 732.1, 730.4; 296/188, 146.6

(56) References Cited

U.S. PATENT DOCUMENTS

| | | | |
|---|---|---|---|
| 5,232,261 A | | 8/1993 | Kuroda et al. |
| 5,277,470 A | | 1/1994 | Freeman et al. |
| 5,404,690 A | * | 4/1995 | Hanf |
| 5,689,986 A | * | 11/1997 | Jacobs, Jr. |
| 5,756,167 A | | 5/1998 | Tamura et al. |
| 5,813,718 A | | 9/1998 | Masuda et al. |
| 5,926,930 A | * | 7/1999 | Tamura et al. |
| 5,992,922 A | * | 11/1999 | Harbig et al. |
| 6,050,049 A | | 4/2000 | Kowalski et al. |
| 6,290,282 B1 | * | 9/2001 | Hortlund et al. |
| 6,454,884 B1 | | 9/2002 | McNulty et al. |

FOREIGN PATENT DOCUMENTS

| | | |
|---|---|---|
| DE | 19640568 A1 | 4/1998 |
| DE | 19715795 A1 | 10/1998 |
| DE | 19749902 A1 | 5/1999 |
| JP | 4238725 | 8/1992 |

OTHER PUBLICATIONS

English language translation of German Patent 197 49 902.
English language translation of German Patent 196 40 568.

* cited by examiner

Primary Examiner—Irene Cuda-Rosenbaum
Assistant Examiner—T. Nguyen
(74) Attorney, Agent, or Firm—Warner Norcross & Judd LLP

(57) ABSTRACT

A method of rollforming one-piece tubular doorbeams. The method includes the steps of drawing a continuous metal strip, creating cut-outs in the edges of the strip at spaced locations, rollforming the strip into a tube so that the unindented edges engage one another, welding the engaged edges together, cutting the tube in the areas of the cut-outs to create pre-forms, and opening the ends of the pre-forms to create end brackets. Additional optional steps provide customization of the end brackets.

28 Claims, 7 Drawing Sheets

| PROCESS OPTION 1 201 | *PROCESS OPTION 2 202 | PROCESS OPTION 3 203 | PROCESS OPTION 4 204 |
|---|---|---|---|
| PURCHASE STEEL STRIP | PURCHASE STEEL STRIP | PURCHASE BORON STEEL STRIP | PURCHASE BORON STEEL STRIP |
| PRE-PIERCE ROLLFORM TUBE HF WELD INLINE ANNEAL - HF SIZE / STRAIGHTEN CUT TO LENGTH TRANSFER TO DIE | PRE-PIERCE ROLLFORM TUBE LASER WELD SIZE / STRAIGHTEN CUT TO LENGTH TRANSFER TO ANNEAL | PRE-PIERCE ROLLFORM TUBE HF WELD INLINE HEAT TREAT - HF QUENCH ONLINE SIZE / STRAIGHTEN CUT TO LENGTH TRANSFER TO DIE | PRE-PIERCE ROLLFORM TUBE HF WELD SIZE / STRAIGHTEN CUT TO LENGTH TRANSFER TO ANNEAL |
|  | ANNEAL TUBE ENDS VIA CONVEYOR WITH IR HEAT LAMPS |  | HARDEN TUBE CENTER VIA HF COIL, QUENCH, TRANSFER |
| OPEN WELD SEAM FLATTEN BRACKETS PIERCE HOLES FOLD/BEND CORNERS TRIM EDGES | OPEN WELD SEAM FLATTEN BRACKETS PIERCE HOLES FOLD/BEND CORNERS TRIM EDGES | OPEN WELD SEAM FLATTEN BRACKETS PIERCE HOLES FOLD/BEND CORNERS TRIM EDGES | OPEN WELD SEAM FLATTEN BRACKETS PIERCE HOLES FOLD/BEND CORNERS TRIM EDGES |
| LASER MARKING COMPANY NAME DATE , SHIFT CUSTOMER PART NUMBER, BAR CODE | LASER MARKING COMPANY NAME DATE , SHIFT CUSTOMER PART NUMBER, BAR CODE | LASER MARKING COMPANY NAME DATE , SHIFT CUSTOMER PART NUMBER, BAR CODE | LASER MARKING COMPANY NAME DATE , SHIFT CUSTOMER PART NUMBER, BAR CODE |
| AUTO INSPECT TWIST, FEATURE PRESENCE, HOLE PRESENCE, ETC STORE DATA VIA BARCODE READING | AUTO INSPECT TWIST, FEATURE PRESENCE, HOLE PRESENCE, ETC STORE DATA VIA BARCODE READING | AUTO INSPECT TWIST, FEATURE PRESENCE, HOLE PRESENCE, ETC STORE DATA VIA BARCODE READING | AUTO INSPECT TWIST, FEATURE PRESENCE, HOLE PRESENCE, ETC STORE DATA VIA BARCODE READING |
| PACK AND SHIP | PACK AND SHIP | PACK AND SHIP | PACK AND SHIP |

FIG. 3

METHOD OF MANUFACTURING A ONE-PIECE TUBULAR DOORBEAM

This application claims the benefit of U.S. Provisional Application No. 60/217,790 filed Jul. 12, 2000 entitled "One (1) Piece Tubular Doorbeam".

BACKGROUND OF THE INVENTION

I. Field of the Invention

The present invention relates to the forming of a tubular beam and more particularly to a one-piece tubular beam.

II. Description of the Art

Vehicle doorbeams are widely used in the automotive industry to enhance the impact strength of vehicle doors and thereby to enhance passenger safety. Typically these beams are fabricated from multiple pieces including a metal tube and brackets welded on the opposite ends of the tube. The brackets are used in securing the beam within the door frame. Such beams are not without their drawbacks. First, the multi-piece beams require numerous manufacturing steps, and therefore are relatively labor-intensive and expensive. Second, the structural integrity of these doorbeams greatly depends on weld consistency and weld quality. Third, any welding splatter left on the beam may cause a squeak if the splatter contacts another interior door component.

The doorbeams also can be manufactured as a single-piece or one-piece beam. A method for roll-forming such a beam is illustrated in U.S. Pat. No. 5,756,167 issued May 26, 2998 to Tamura et al. The Tamura process rollforms continuous strip stock into one-piece beams using specially designed rollers. The rollers have a circumference that corresponds to the length of the beam. The rollers create alternating rolled body portions and flat end brackets joined together by curving transition portions. This process also is not without its drawbacks. First, the tooling is extraordinarily expensive. Second, the separate set of tooling is required for each doorbeam. Third, extensive set up time is required when a new/different doorbeam is to be manufactured. As part of the set up, different circumference rollers require different distances between the axes of opposing and adjacent rollers.

One-piece beams also can be manufactured using stamping or pressing methodologies. Examples of such processes are illustrated in U.S. Pat. No. 5,183,718 issued Sep. 29, 1998 to Masuda et al and Japanese Patent Publication 4-238725 published Aug. 26, 1992. These methods form individual metal blanks into beams, and also are not without their drawbacks. First, these methods are relatively labor intensive resulting in relatively high manufacturing costs because individual blanks must be press formed. Second, stamping often utilizes less of the sheet than rollforming, thereby creating more waste. Third, different doorbeams require different tooling.

SUMMARY OF THE INVENTION

The aforementioned problems are overcome in the present application wherein a one-piece doorbeam is rollformed from continuous stock using relatively simple tooling and producing relatively little waste. More specifically, the process includes the steps of removing material from the edge of a continuous metal stock at spaced locations, rollforming the entire stock into a tubular shape so that the opposite edges engage one another except where material has been removed, welding the engaged edges, severing the tubular shape in the area where material was removed to create a rollformed piece having two ends, and opening at least one of the ends to create an end bracket.

The present invention has a variety of advantages over the prior techniques. First, highly specialized and unique tooling is not required. Second, virtually any length doorbeam can be created using a single set of tooling. Third, the integral end brackets can be uniquely shaped and processed following the basic forming steps. Consequently, the present invention is relatively labor efficient and inexpensive. Further, the quality and consistency of the tubular beam is improved.

These and other objects, advantages and features of the invention will be more fully understood and appreciated by reference to the detailed description of the preferred embodiment and the drawings.

BRIEF DESCRIPTION OF THE DRAWINGS

FIG. 3 is a block diagram of four different processing options all using the process;

DETAILED DESCRIPTION OF THE PREFERRED EMBODIMENT

Figure 1:
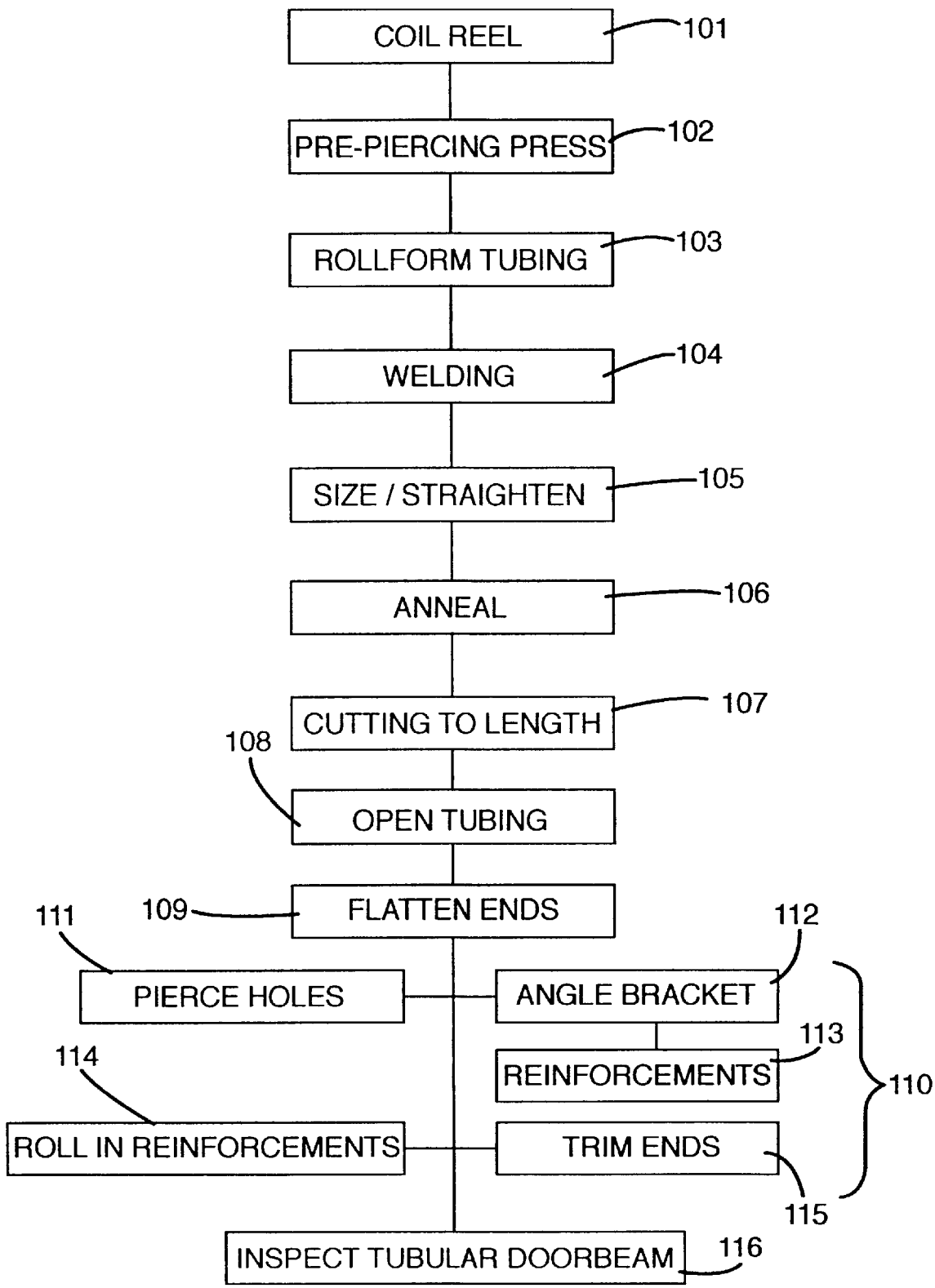
FIG. 1 is a flow diagram of the process of the present invention.
Figure 2:
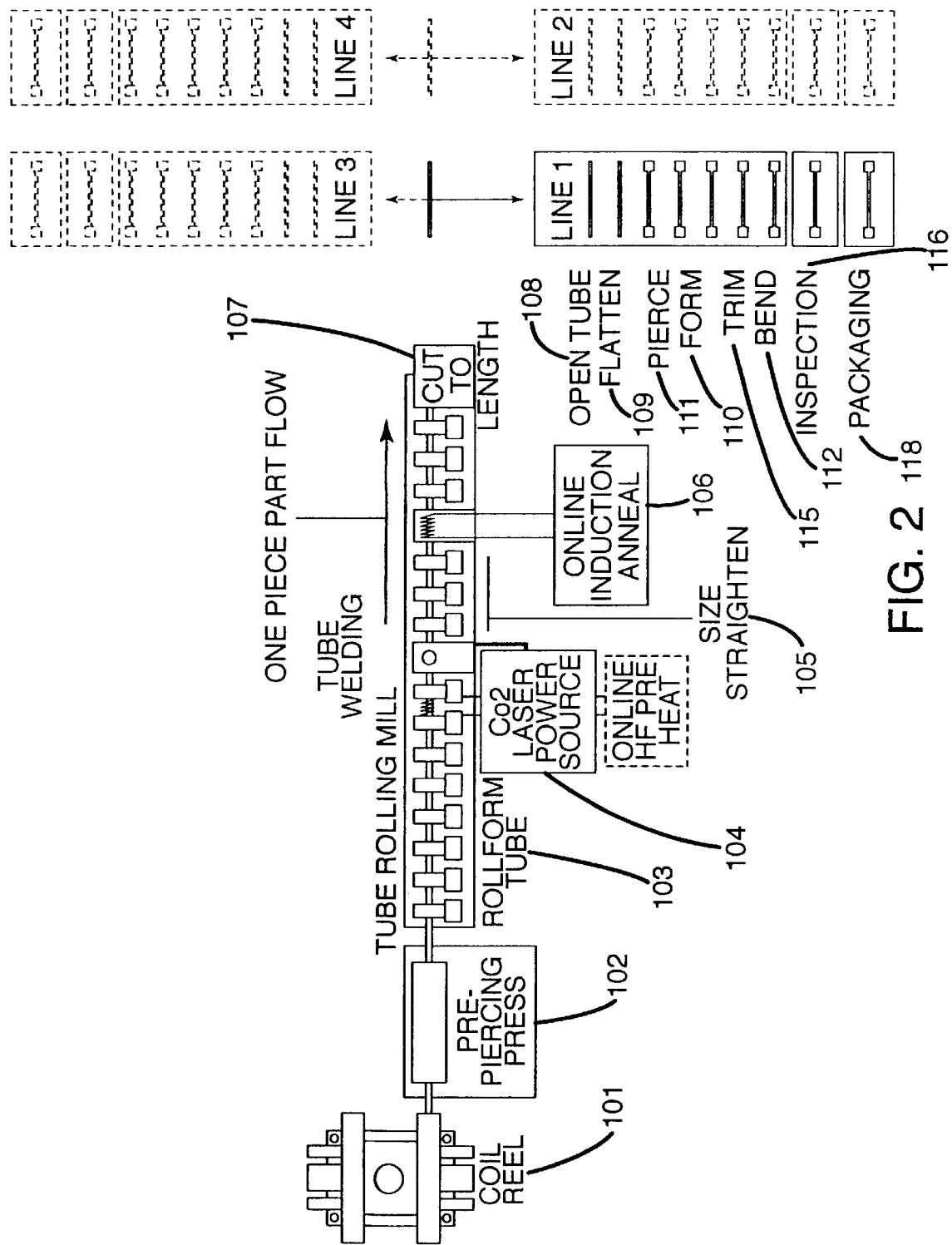
FIG. 2 is a schematic view of the process.
Figure 4:
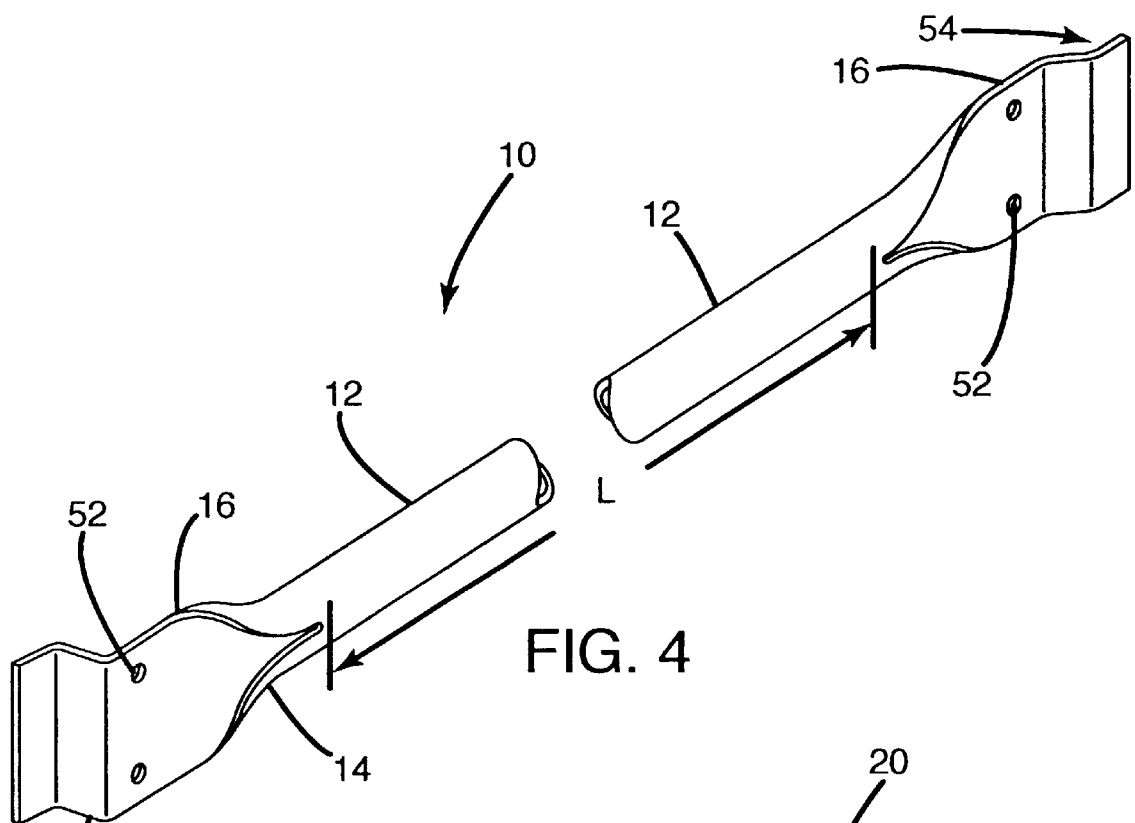
FIG. 4 is a perspective view of a door beam formed using the process and broken to show indeterminate length.

The manufacturing process of the present invention is illustrated in FIGS. 1–3; and a tubular doorbeam fabricated using the process is illustrated in FIG. 4 and generally designated 10. The beam 10 is a single piece and includes a tubular body 12, a transition area 14, and end brackets 16.

I. Manufacturing Process

Figure 5:
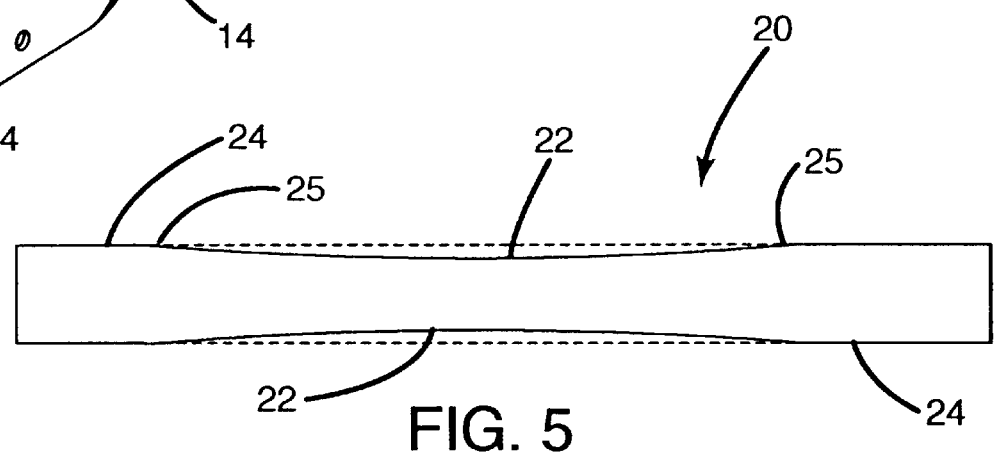
FIG. 5 is a top view of a portion of the continuous metal strip showing the area of the pierced indentations.

As illustrated in FIGS. 1–3 the tubular beam starts as a continuous web of flat stock drawn from a coil. As seen in FIG. 5 (which shows the stock after the pre-piercing step), the stock includes a pair of opposite edges 24. In the preferred embodiment, the edges as the stock are linear and uniformly spaced from one another so that the stock has a uniform width. In the preferred embodiment, the material is martinsitic steel (i.e. Martinsite) such as Inland M220 ultra high strength low alloy steel. Of course, other materials could be used that have suitable properties for the performance requirements of the doorbeam.

The first step 101 is the feeding of the continuous metal stock into a pre-piercing press.

The second step 102 is the trimming of the opposing linear edges 24 by the pre-piercing press at regularly spaced or period intervals forming indentations or cut-outs 22 (see FIG. 5). The pre-pierced, but still flat, stock is designated 20. The spaced points 25 define the opposite ends of each indentation 22. The distance between the points 25 corresponds to the length L of the tubular body 12 of the finished beam 10. Depending on the implementation of the fourth step 104 of welding, this second step may be omitted.

Figure 6:
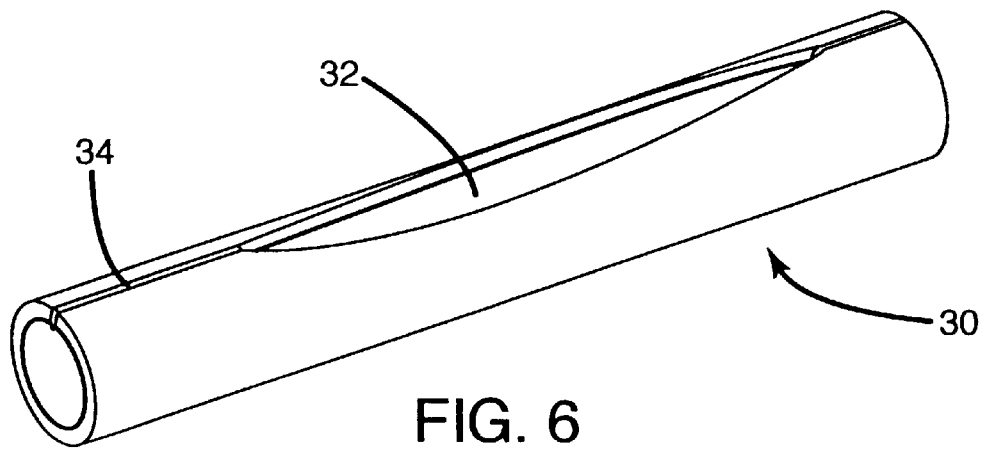
FIG. 6 is a view of a portion of the continuous rolled tube showing the area of pierced indentations.

The third step 103 is the rollforming of the pre-pierced stock 20 within a tube rolling mill. The flat stock 20 is rollformed into a tubular shape generally designated 30 (see FIG. 6). In the continuous tubular shape 30, the opposite edges 24 of the stock engage one another in areas other than the cut-outs 22. Preferably, the edges 24 abut one another, but they also could overlap one another. The cut-outs 22 create elongated gaps or spaces 32. The edges of the cut-outs 22 do not engage one another. The rolling mill operates at a speed at which the subsequent steps are able to accept material.

The fourth step 104 is to weld the lateral edges 24 together between the elongate spaces 32. The welding apparatus may operate continuously as the stock moves through the welder (because the spaced cut-outs 22 will not be joined), or the welding apparatus may be operated only in the areas between the elongate spaces 32 (i.e. only where the edges 24 engage one another. Further, if the second step 102 of pre-piercing has been omitted, the welding apparatus must be operated intermittently to create areas of joined edges separated by areas of unjoined edges. The preferred welder is a laser welder to obtain high weld quality. Any suitable welding technique, such as induction welding, also could be used. The welding seam 36 results from the welding (see FIG. 7).

The fifth step 105 is to size and straighten the welded tubular shape to increase the uniformity of the final beams 10.

The sixth step 106 is to anneal the continuous stock. In the preferred embodiment, annealing performed only in the approximate area of the elongate spaces 32. Annealing also can be performed before or after other steps in the process depending on the desired qualities and characteristics to be imparted to the doorbeam both for processing (e.g. pre-piercing) and/or as a final product.

Figure 7:
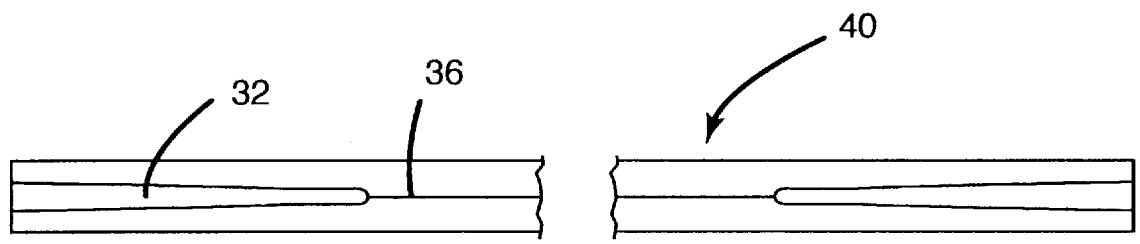
FIG. 7 is a view of the individual door beam cut to length in the area of cut-outs, broken to show indeterminate length.
Figure 8:
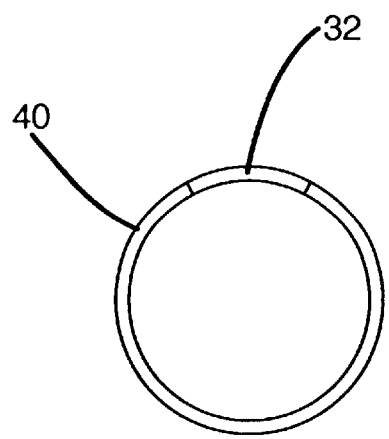
FIG. 8 is an end view of the beam in FIG. 7.

The seventh step 107 is to cut the continuous tubular form into lengths creating individual items or pre-forms 40 (see FIGS. 7–8). This step occurs at the end of the rollforming line. The cuts occurs in the area of the elongate spaces 32 (if the stock has been pre-pierced) or in the area of unjoined edges (if the stock has not been pre-pierced), so that an unwelded portion remains at each end of the pre-form 40.

Figure 9:
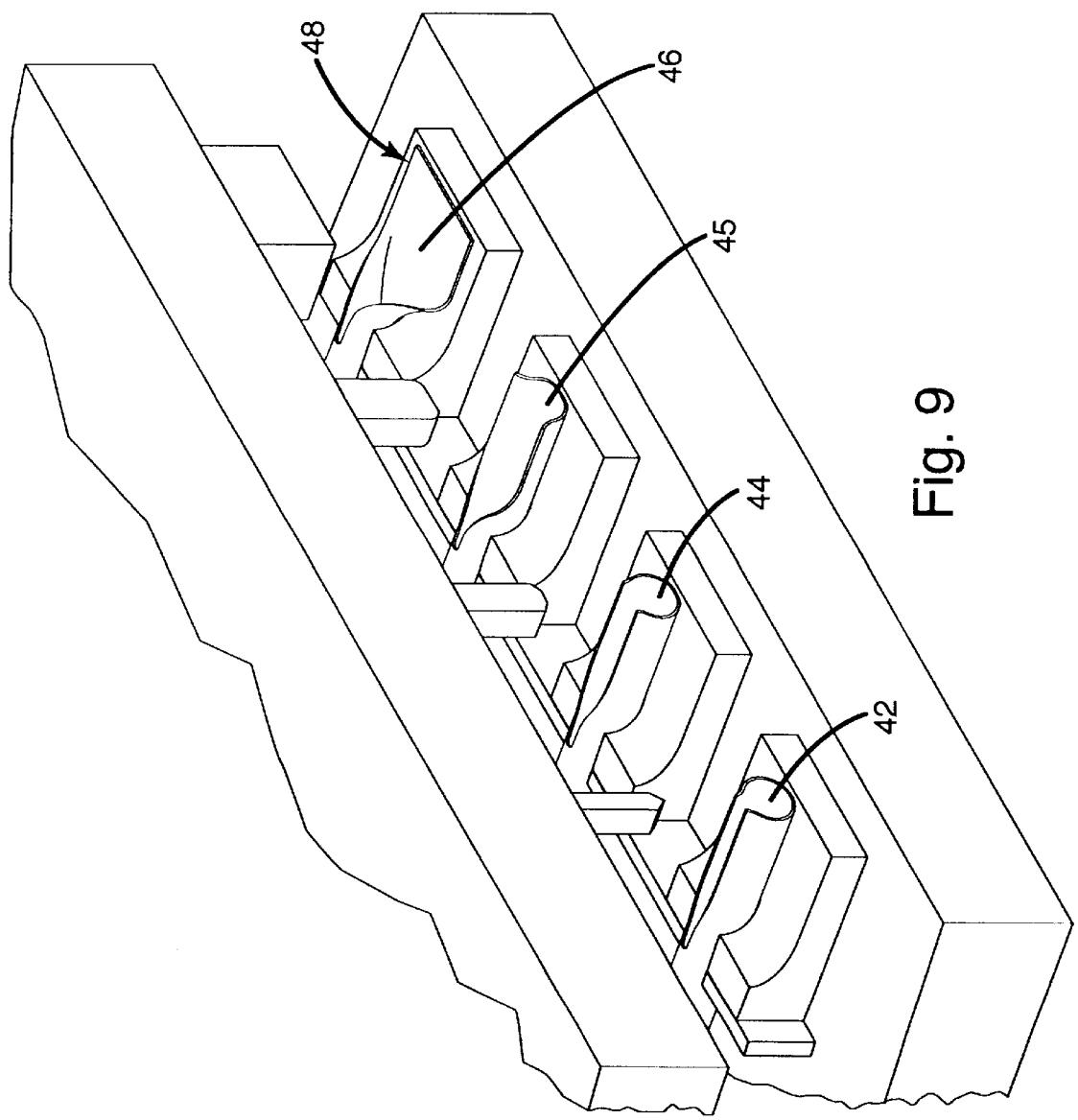
FIG. 9 is a perspective view of the beam pre-forms in a progressive press in which the ends of the pre-forms are opened and flattened.

In the eighth step 108, the end of each pre-form 40 is opened to create a relatively flat end. The progressive press used to perform this step is illustrated in FIG. 9. Preferably, the opening step includes a plurality of forming steps but may be done with only one step. In the preferred embodiment the elongate space 32 is initially opened as illustrated at 42 and is further opened as illustrated at 44, 45, and 46. After stamping in the final die, the end bracket 48 is fully formed.

The subsequent steps (i.e. those after the opening step 108) occur on various lines to perform different processes as illustrated in FIGS. 2 and 3. The particular processes or steps 110 utilized in each line will depend on the desired shape and features to be imparted to the ultimate doorbeam. The four process options illustrated in FIG. 3 are exemplary, and other process options can be readily developed depending on the desired result.

Figure 10:
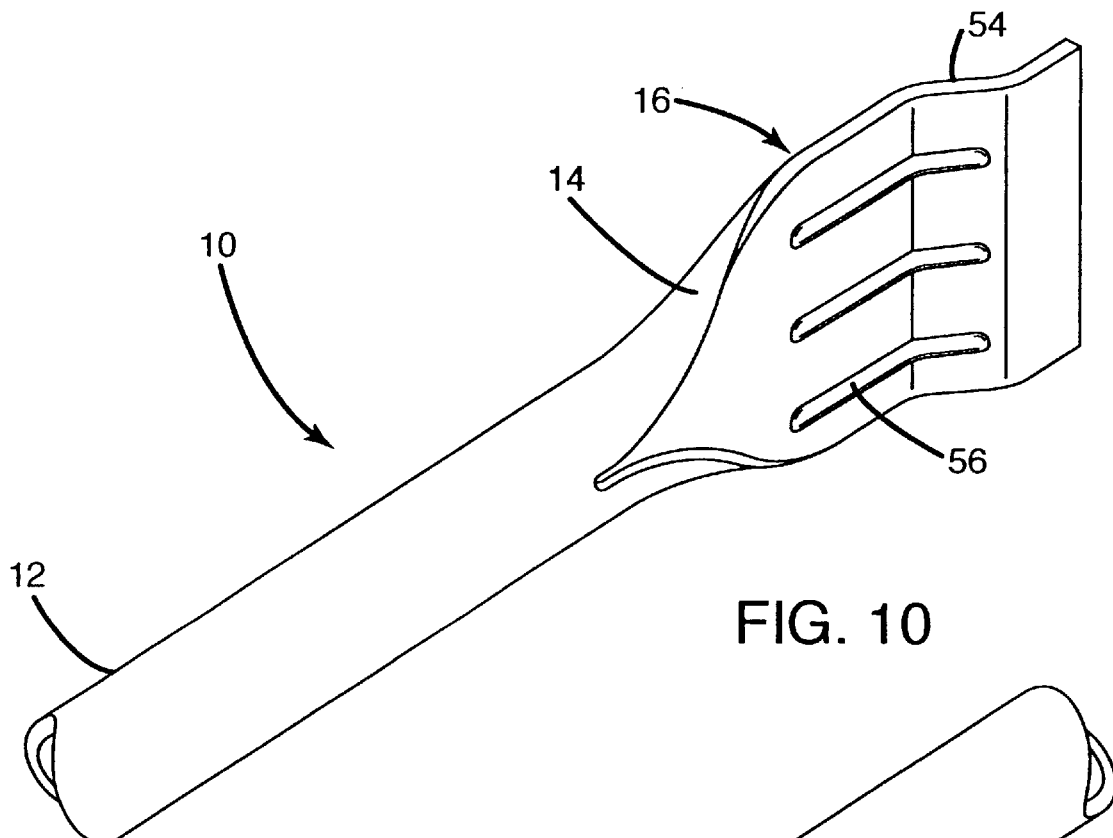
FIG. 10 is a perspective view of the end of a door beam with reinforcement gussets.
Figure 11:
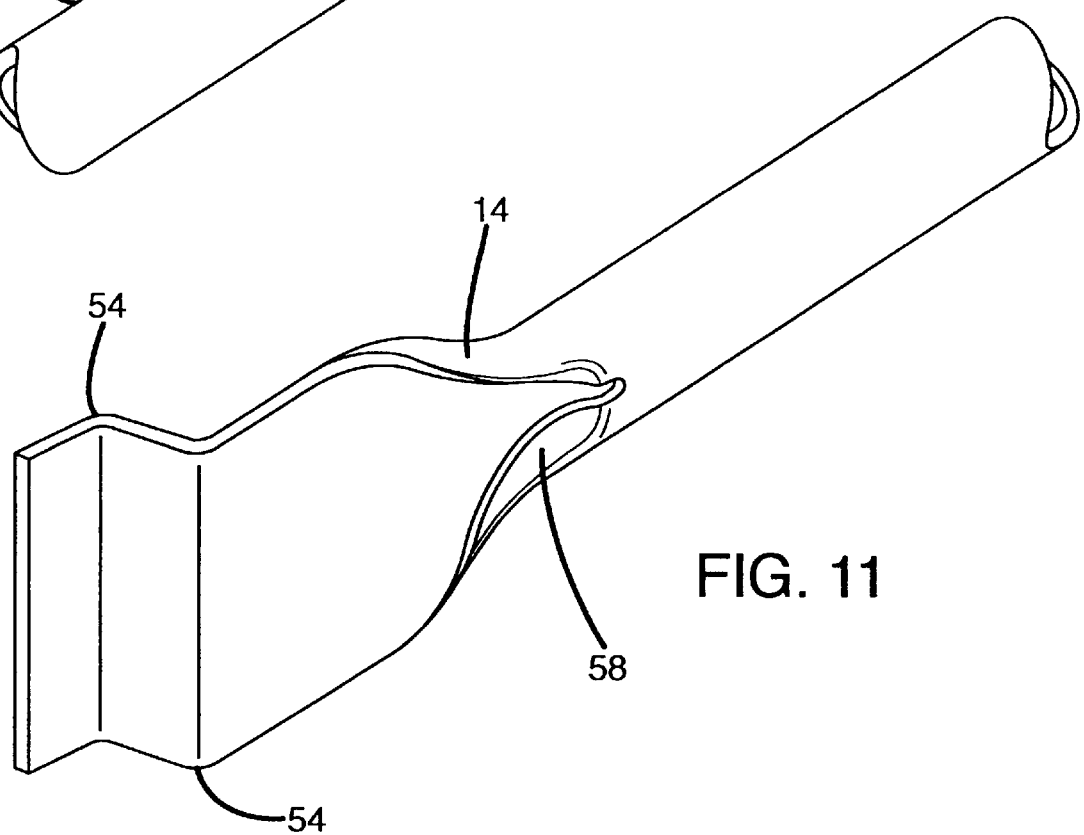
FIG. 11 is a perspective view of the end of a door beam with rolled-in reinforcements in the transition area.

One alternative forming step 111 is to pierce at least one hole 52 (see FIG. 4) in the end bracket 16. As many holes as are needed may be pierced. A second alternative forming step 112 is to add bends or angles 54 (see FIGS. 4 and 10–11) to the end bracket 16. The angles 54 can be any one of a variety of shapes, and the angle may vary greatly depending upon the installation needs of the tubular beam 10. A third alternative forming step 113 is to add reinforcement gussets 56 (see FIG. 10) to the angles 54 on the end bracket 16 to strengthen the bracket 16. A fourth alternative forming step 114 is the rolling in of reinforcements 58 (see FIG. 11). In this step the edges of the trimmed cut-outs 22 are rolled over and into the center of the transition area 14. This doubling back of the edges of the cut-outs 22 strengthens the transition area 14. This rolling may also be done to reduce the profile of the transition area 14 to enable installation in areas with little clearance. A fifth alternative step 115 is to trim the end bracket 16 to a final shape and size. The trimming of the edges after all forming steps have completed provides improved consistency of the resulting doorbeams 10. The alternative steps may be preformed in virtually any order or in any combination.

After all forming, shaping and trimming steps have been completed the door beam may be laser marked with the company name, date, shift, customer part number, or bar code to identify and track the beam for quality control reasons. Preferably each doorbeam is inspected 116 to confirm that has been made to specification. After the doorbeam is inspected 116 it is packaged 118 for shipment.

Four exemplary process options 201, 202, 203, and 204 are illustrated in FIG. 3. Each includes a various combination of the above-described steps, as well as other steps that will be recognized and understood by those skilled in the art.

The invention can be used to create a wide, and indeed limitless, variety of one-piece tubular doorbeams 10 wherein the tubular body 12 is integral with the end brackets 16 through a transition area 14. The present invention results in an improved product at a lower cost.

The above descriptions are those of preferred embodiments of the invention. Various alterations and changes can be made without departing from the spirit and broader aspects of the invention as defined in the appended claims, which are to be interpreted in accordance with the principles of patent law including the doctrine of equivalents.

What is claimed is:

1. A method of forming a metallic item comprising the steps of:
    trimming the opposed lateral edges of a continuous metal blank to create a plurality of cut-outs in the opposed lateral edges;
    forming the continuous metal blank into a tubular shape;
    welding along the length of the tubular shape, whereby the lateral edges are joined only in the areas between the cut-outs;
    cutting the welded tubular shape in the areas of the cut-outs thereby creating a plurality of items; and
    opening an end of each item to create a non-tubular portion on the item.

2. A method as defined in claim 1 wherein following said welding step, the continuous tube is annealed.

3. The method of claim 1 wherein said opening an end step forms a transition area between the end and the tubular shape, said opening an end step further comprising a step of rolling the edges of the cut-outs inwardly so as to form said transition area.

4. A method as defined in claim 1 wherein said step of opening an end further comprises the step of piercing holes in the end.

5. A method as defined in claim 1 wherein said step of opening an end further comprises the step of angling a portion of the end.

6. A method as defined in claim 1 wherein said step of opening an end further comprises the step of trimming the end.

7. A method of forming an item comprising the steps of:
trimming a continuous metal strip to form a plurality of indentations in the opposed lateral edges;
rollforming the continuous metal strip into a continuous tubular shape wherein the opposed lateral edges engage each other;
welding the engaging untrimmed lateral edges of the continuous tubular shape;
cutting the welded continuous tubular shape in the area of the indentations thereby creating a plurality of items; and
opening an end of each item to create a non-tubular end.

8. A method as defined in claim 7 wherein the continuous tubular shape is annealed in the area of the indentations between said welding step and said cutting step.

9. A method as defined in claim 8 wherein between said welding step and said annealing step the continuous tubular shape is sized and straightened.

10. A method as defined in claim 7 wherein said opening step includes opening both ends of each item to create non-tubular ends.

11. A method as defined in claim 7 further comprising the step of piercing at least one hole on the end.

12. A method as defined in claim 7 further comprising the step of forming an angled bracket from the end.

13. A method as defined in claim 12 further comprising the step of adding reinforcements to the angled bracket.

14. The method as defined in claim 7 wherein said welding step is performed by a laser.

15. A method of forming doorbeams comprising the steps of:
providing a continuous web of flat stock having a pair of opposed linear edges;
trimming at least one of the linear edges at spaced locations along the length of the flat stock creating trimmed edges and leaving untrimmed edges;
forming the trimmed flat stock into a generally tubular shape with the untrimmed linear edges engaging one another;
welding the engaging untrimmed lateral edges of the generally tubular shape;
severing the welded tubular shape in the area of the trimmed lateral edges thereby creating a plurality of tubular lengths; and
opening at least one end of each tubular length in the area of the trimmed edges to create a bracket.

16. The method of claim 15 wherein following said welding step, the area of the trimmed linear edges is annealed.

17. The method of claim 16 wherein said step of opening at least one end of the tubular length further comprises a final forming step of forming a relatively flat end on the tubular length in the area of the trimmed edges.

18. The method of claim 17 further comprising the step of piercing holes in the relatively flat end.

19. The method of claim 17 further comprising the step of angling the relatively flat end.

20. The method of claim 19 further comprising the step of adding reinforcements to the angled end.

21. A method of forming doorbeams comprising the steps of:
providing a continuous web of sheet stock having a pair of lateral edges;
forming the continuous web into a generally closed configuration with at least portions of the lateral edges engaging one another;
joining the engaging portions of the lateral edges in first longitudinal segments separated by unjoined portions of the lateral edges in second longitudinal segments;
severing the joined closed configuration in the unjoined second longitudinal segments thereby creating a plurality of lengths; and
opening at least one end of each length to create a bracket.

22. The method of claim 21 further comprising the step of forming a relatively flat bracket.

23. The method of claim 21 further comprising the step of piercing at least one hole in the bracket.

24. The method of claim 21 further comprising the step of forming an angled portion in the bracket.

25. The method of claim 24 further comprising the step of adding at least one reinforcement to the angled portion of the bracket.

26. The method of claim 21 further comprising the step of trimming the bracket.

27. The method of claim 21 wherein said step of joining the lateral edges includes welding.

28. The method of claim 21 wherein:
said opening one end step forms a transition area between the bracket and the generally closed configuration; and
said opening step includes deforming the transition area radially inwardly.

* * * * *